Jan. 26, 1965  R. B. SNAPP ETAL  3,167,361
ROTATING BEARING
Filed May 28, 1963

INVENTOR.
RALPH B. SNAPP
WATT V. SMITH
BY
ATTYS.

United States Patent Office 3,167,361
Patented Jan. 26, 1965

---

3,167,361
ROTATING BEARING
Ralph B. Snapp and Watt V. Smith, Severna Park, Md., assignors to the United States of America as represented by the Secretary of the Navy
Filed May 23, 1963, Ser. No. 284,299
1 Claim. (Cl. 308—8)
(Granted under Title 35, U.S. Code (1952), sec. 266)

The invention described herein may be manufactured and used by or for the Government of the United States of America for governmental purposes without the payment of any royalties thereon or therefor.

This invention relates to bearings and more particularly to the lubrication of bearings of the type which have longitudinally running staves or lands for providing the bearing surface.

Rubber bearings have been frequently employed in the marine industry for supporting propeller shafts. In such a bearing, either strips or staves of rubber are attached to the inside of the bearing block or lands are molded in the rubber of the integral type of bearing to provide the bearing surface upon which the propeller shaft rotates. The spaces or grooves between these staves or lands form passages for the flow of water. The rubber being resilient, yields to any abrasive particles which may work between the shaft and the bearing, thus absorbing abrasive pressure and reducing wear. Also the water circulated through the passages between the staves sweeps between the staves and the propeller shaft so as to provide lubrication and to flush out abrasive particles.

When the bearing is rotated in relation to the shaft, however, servere vibrations occur as a result of nonuniform stave or land width and nonconcentricity of the outside and inside bearing diameters. When the inside diameter is ground or machined to improve the concentricity, the rounded stave profile is destroyed. The resulting abrupt edges tend to scrape the fluid from the shaft surface, resulting in high torque and high temperatures and thereby requiring high water flow rates to maintain acceptable operating temperatures.

Accordingly, it is an object of this invention to provide an improved bearing for rotating bearing applications, both with and without shaft rotation.

It is a further object of this invention to provide a bearing having improved lubrication and reduced wear.

It is a still further object of this invention to provide an elastomeric bearing in which the lubricant is efficiently circulated between the staves and the journal.

Other objects and many of the attendant advantages of this invention will be readily appreciated as the same becomes better understood by reference to the following detailed description when considered in connection with the accompanying drawings wherein.

Figure 1:
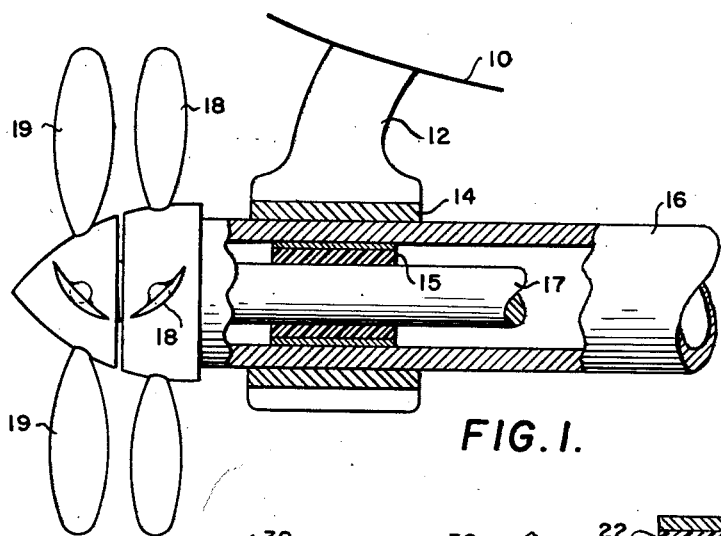
FIG. 1 is a cross-sectional view of contrarotating propellers, propeller shafts, a supporting strut bracket, and bearing in which the invention may be used.

Referring now in particular to FIG. 1 a perspective view is shown of the stern 10 of a ship, a strut bracket 12 attached to the stern 10 of the ship and supporting a bearing block 14, an outer propeller shaft 16 supported by the bearing block 14, and a propeller 18 attached to the propeller shaft 16. An inner propeller shaft 17 is supported by a bearing 15 mounted inside the outer shaft 16. A propeller 19 is attached to the inner shaft 17.

Each of these parts of the ship shown in FIG. 1 is normally submerged in water. This water forms the lubrication between the bearing 14 and the rotating propeller shaft 16 and between bearing 15 and rotating shaft 17.

Figure 2:
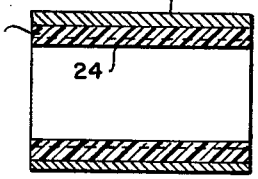
FIG. 2 is a side cross-sectional view of a bearing which is an embodiment of this invention.

Referring to FIG. 2, there is shown a side cross-sectional view of the bearing which is an embodiment of the invention, comprising a bronze bearing back 20 with a bore into which the bearing material 22 is bonded or fitted. The bearing material 22 may be made, for example, of elastomeric material such as rubber. The propeller shaft turns on the inner surface 24 of the bearing material 22. The bearing material 22 may be bonded to the bearing back 20 or may be mechanically attached.

Figure 3:
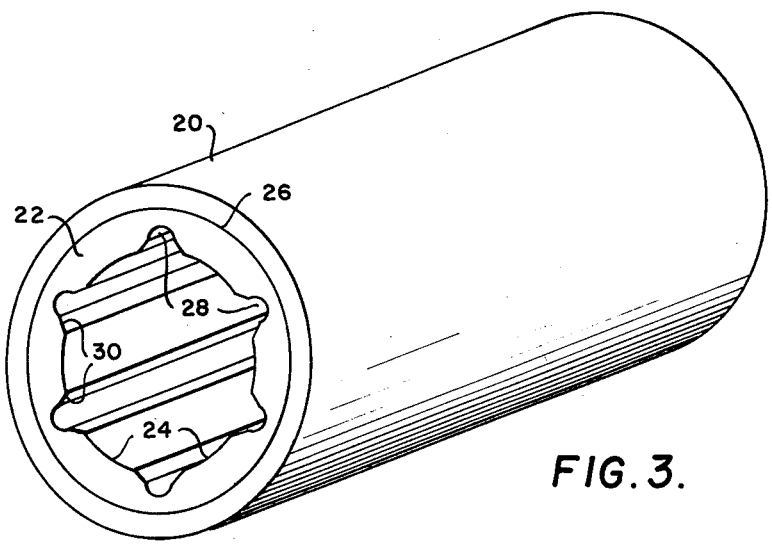
FIG. 3 is a perspective view of a bearing which is an embodiment of this invention.

A perspective view of the bearing back 20 and the bearing material 22 is shown in FIG. 3. The outer surface 26 of the bearing material 22 is bonded or otherwise secured to the surface of the bore in the bearing back 20. The inner surface 24 of the bearing material 22 is formed into a plurality of raised portions (staves, or lands) for supporting the propeller shaft. A series of grooves 28 are located between each pair of lands 24. These grooves 28 form passageways through the bearing so as to permit the flow of water through the bearing. When the shaft is rotated large amounts of water pass through the bearing so as to afford cooling and lubrication. As the shaft turns in the bearing the water in the grooves 28 is pumped over the surface 24 of the lands to reduce friction. The grooves 18 are connected to the land surfaces 24 by ramps 30 which provide an entering wedge for the water film to be pumped over the land surface by the rotating propeller shaft.

Figure 4:
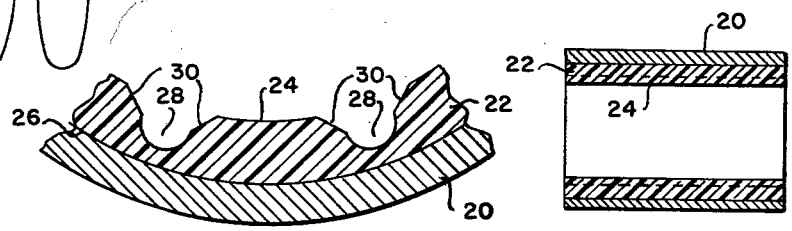
FIG. 4 is an elevational cross-sectional view of part of a bearing material bearing back which is an embodiment of this invention.

An elevational cross-sectional view of part of a rubber bearing material 22 and a metal bearing back 20 is shown in FIG. 4. The bearing material 22 has an outer side 26 bonded to the bore of the bearing back 20, a plurality of grooves 28, a plurality of lands 24 interleaved between the grooves 28, and ramps 30 connecting the grooves 28 to the lands 24 on the inner side of the bearing. The lands 24 are machined or ground with a tolerance of plus or minus 2 thousandths of an inch and with an inner diameter to outer diameter runout of less than 2 thousandths of an inch.

For a bearing having an inner diameter of six inches, a ramp one eighth to five thirty-seconds of an inch long and one sixteenth to three thirty-seconds of an inch deep may be machined or ground for use in a typical ship. Similarly for a bearing having an inner diameter of fourteen inches the ramp will be three eigths of an inch long with a tolerance of one sixteenth and one eighth of an inch deep with a tolerance of one thirty-second.

The ramps are machined so that the resultant crown width is as uniform as posible along its length and as close to the same width as possible from land to land. The ramps should be of such length and depth that compression of the elastomer bearing material under load will allow shaft contact over not more than one half of the ramp width. A ramp which is too small will be lost in compression of the elastomer material under load, whereas too deep a ramp will present a sharp edge with resulting scraping action.

The bearing construction of this invention provides efficient lubrication. The ramps provide less vibration through controlled stave or land width and reduce friction by aiding in the formation of fluid films. The integral construction and the ramp structure permit precision machining or grinding of the bearing to further reduce vibration.

Obviously many modifications and variations of the present invention are possible in the light of the above teachings. It is therefore to be understood that within the scope of the appended claim the invention may be practiced otherwise than as specifically described.

What is claimed is:

A fluid lubricated bearing for counter rotating shafts comprising:
- a support;
- a first hollow shaft rotatably mounted in said support;
- a second shaft coaxially mounted within said first shaft;
- a fluid lubricated bearing interposed between said first and second shafts, said bearing being secured to and rotatable with said first shaft;
- said bearing consisting of a sleeve like member and an elastometric material;
- said member having a plurality of load bearing lands separated from each other by grooves;
- the inner suporting machined surface of each of said supporting lands being constructed to conform to the outer surface of said second shaft;
- flat ramp surfaces leading from the sides of each groove to each of the adjacent lands, said flat ramp having a slope such that the unabsorbed portion of the ramp forms an obtuse angle with the land and being such that the deformation of the land under load produces in the ramp insufficient deformation to form a wiping lip at the edge between the land and the groove, thereby to prevent restriction of the flow of lubricating fluid onto the bearing surfaces.

References Cited by the Examiner

FOREIGN PATENTS 551,629    1/58    Canada.
625,487    6/49    Great Britain.

OTHER REFERENCES

Rubber Age, pages 173 to 179 relied upon, published in May 1949, 308–238.

FRANK SUSKO, *Primary Examiner*.